US006453088B1

(12) United States Patent
Lewis et al.

(10) Patent No.: US 6,453,088 B1
(45) Date of Patent: Sep. 17, 2002

(54) SEGMENTED WAVEGUIDE FOR LARGE DIAMETER FIBER OPTIC ROTARY JOINT

(75) Inventors: Norris E. Lewis, Christiansburg; Anthony L. Bowman, Pembroke; Robert T. Rogers, Blacksburg, all of VA (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 09/629,146

(22) Filed: Jul. 31, 2000

(51) Int. Cl.[7] .............................. G02B 6/26; G02B 6/42
(52) U.S. Cl. .............................. 385/25; 385/26; 378/15; 359/159
(58) Field of Search ............................. 385/25, 26, 36, 385/146; 359/159; 378/15

(56) References Cited

U.S. PATENT DOCUMENTS

| | | | |
|---|---|---|---|
| 4,109,997 A | 8/1978 | Iverson | 385/26 |
| 4,525,025 A | 6/1985 | Hohmann et al. | 385/26 |
| 4,555,631 A | 11/1985 | Martens | 359/159 |
| 4,643,521 A | 2/1987 | Harstead et al. | 385/31 |
| 4,646,086 A | 2/1987 | Helzel | 359/159 |
| 4,796,183 A | 1/1989 | Ermert et al. | 378/15 |
| 5,134,639 A | 7/1992 | Vekstein et al. | 378/15 |
| 5,436,988 A * | 7/1995 | Narendran | 385/26 |
| 5,555,334 A | 9/1996 | Ohnishi et al. | 385/93 |
| 5,991,478 A | 11/1999 | Lewis et al. | 385/26 |
| 6,104,849 A | 8/2000 | Lewis et al. | 385/26 |

FOREIGN PATENT DOCUMENTS

| DE | 2441359 | 8/1974 | H04B/9/00 |
|---|---|---|---|
| EP | 5738228 | 2/1981 | H04B/9/00 |

* cited by examiner

*Primary Examiner*—Brian Healy
*Assistant Examiner*—Kevin S Wood
(74) *Attorney, Agent, or Firm*—Lowe Hauptman Gilman & Berner, LLP

(57) ABSTRACT

The present invention is directed to segmented waveguide for a fiber optic rotary joint. The segmented waveguide is mountable to the existing stator surface. The segmented waveguide is capable of receiving signals from the rotor. The fiber optic rotary joint includes a rotor and an existing stator surface. The rotor is rotatable through a full 360° and is concentric to the existing stator surface. The rotor has one of a plurality of light transmitters and light receivers connected to a first circumference of the rotor. The segmented waveguide includes a reflective waveguide surface shaped to match a potion of existing stator surface. At least one waveguide support supports the reflective waveguide surface and is connectable to the existing stator. At least one of a light transmitter or light receiver is optically coupled to a reflective waveguide surface.

11 Claims, 5 Drawing Sheets

SEGMENTED WAVEGUIDE FOR LARGE DIAMETER FIBER OPTIC ROTARY JOINT

RELATED APPLICATIONS

The present application is related to a patent application entitled "Parallel Data Transmission Through Segmented Waveguides of Large Diameter", filed on even date herewith, and is related to U.S. patent application Ser. No. 09/531,772, filed Mar. 21, 2000, pending, entitled "Multi-Channel On-Axis Fiber Optic Rotary Joint", and assigned to the instant assignee. Both of these patent applications are hereby incorporated by reference into this specification in their entirety. The present application also relates to U.S. Pat. No. 5,991,478 issued Nov. 23, 1999 entitled "Fiber Optic Rotary Joint", and U.S. patent application Ser. No. 09/115,946 filed Jul. 15, 1998, entitled "Fiber Optic Rotary Joint", both of which are assigned to the instant assignee and are hereby incorporated by reference into the specification in their entirety.

TECHNICAL FIELD

The present invention relates generally to fiber optic rotary joints and, more particularly, to contactless fiber optic rotary joints for transmitting high bit-rate signals. Even more particularly, the present invention relates to a segmented waveguide used in assembling a fiber optic rotary joint and for use in retrofitting an existing cat-scan gantry with a fiber optic rotary joint.

BACKGROUND ART

Devices called fiber optic rotary joints allow optical signals to be transferred between fibers located on rotating and stationary members. The device is categorized as an on-axis rotary joint when the fibers are located along the axis of rotation. The device is categorized as an off-axis rotary joint if access to the axis of rotation or centerline is not possible. The technology employed in these two types of rotary joints is quite different. The present invention concerns off-axis rotary joints.

Contactless fiber optic rotary off-axis joints have been developed as disclosed in U.S. Pat. No. 4,525,025 to the present assignee. The '025 patent discloses a fiber optic rotary joint which couples a pulsed optical signal across a rotary interface and includes an annular reflective wall formed on a stator and an optic fiber mounted on the stator having one end in close proximity and tangential to the annular reflective wall. A signal emitted by one of the optic fibers will be reflected along the annular reflective wall and received by the other of the optic fibers.

Actual joints constructed in a manner similar to that generally disclosed in the '025 patent have been limited to a rotor diameter of 10–12 inches and data rates of 50 megabits/sec. due to unacceptable propagation delays causing bit pulse-width distortion. There is a need for joints having rotor diameters of 40–50 inches using pulsed optical signals having data transfer rates of 1–3 gigabits/sec. To meet these requirements, two criteria must be met. First, optical variations with rotation must be minimized. Second, propagation delays must be controlled to minimize effect on bit pulse-width distortion.

Optical variations with rotation can be minimized by using a multiplicity of optical pick-ups spaced circumferentially. The problem is that it is desirable to have as few pick-ups as possible to minimize complexity and cost.

Propagation delays must be controlled. For example, consider a waveguide that is fonned into a continuous 360° arc that is four meters in circumference. If four fiber optic pick-ups located equidistant around the circumference are focused to a common photodiode and a single light source is used to inject a signal into a waveguide at a point of injection, then the optical pick-up that is nearest to the point of injection will receive the transmitted signal first and thereby transmit the received signal to the photodiode first. Because the second optical pick-up is located 90° away, the optical signal travelling from the point of injection at a speed of three ns/meter will arrive at the second pick-up three ns after the first. Similarly, the third pick-up would receive the transmitted signal after nine ns. Thus, for a four meter circumference continuous waveguide, a propagation delay of twelve ns would result. For a 100 Mb/s signal, which has a 10 ns bit width to be transmitted under these conditions, the bit shape would be distorted by signals arriving at the different optical pick-ups at different times because the propagation delays are larger than the bit width. A larger diameter joint exacerbates the problem and would exhibit even larger delays.

Other difficulties can be encountered when installing a fiber optic rotary joint in, for example, a cat-scan machine. The difficulty with such an arrangement is that the joint is pre-assembled including the rotor and the stator at a factory and then often needs to be dissembled when installed in the gantry of an existing cat-scan machine. It is desirable to reduce the effort and cost to install the fiber optic rotary joint in the cat-scan machine.

Another problem is that it is difficult, expensive and time consuming to install a waveguide for a stator and the various optical transmitters and receivers required to form a fiber optic rotary joint.

SUMMARY OF THE INVENTION

It is, therefore an object of the present invention to provide a fiber optic rotary joint which can transmit a high bit-rate signal.

It is another object of the present invention to provide a fiber optic rotary joint capable of having a circumference of at least 4 meters.

It is yet a further object of the present invention to provide a segmented waveguide which can be used to retrofit an existing gantry to form a fiber optic rotary joint.

It is yet another object of the present invention to provide a method of retrofitting a gantry with a fiber optic rotary joint.

These and other objects of the present invention are achieved by a segmented waveguide for a fiber optic rotary joint, the fiber optic rotary joint includes a rotor and an existing stator surface, the rotor having one of a plurality of light transmitters and light receivers connected to a first circumference of the rotor, a segmented waveguide mountable to the existing stator surface, a segmented waveguide capable of reflecting optical energy transmitted from the plurality of light transmitters on the rotor, the rotor rotatable through a full 360° and concentric to the existing stator surface. A reflective waveguide surface is shaped to match a portion of the exiting stator surface. At least one waveguide support supports the reflective waveguide surface and connects to the existing stator and at least one of a light transmitter or light transmitter optically couples to the reflective waveguide surface.

These and other objects of the present invention are achieved by a waveguide section mountable in an existing circular bore. The reflective waveguide surface extends up to a 135° arc of the existing circular bore. The waveguide section supports structure for mounting a reflective waveguide surface in the existing circular bore and includes one of a light transmitter and a light receiver.

These and other objects of the present invention are a method of retrofitting an existing gantry with a fiber optic rotary joint, securing at least one reflective waveguide surface to an inner diameter of the existing gantry, securing one of a light transmitting device and light receiving device to the reflective waveguide, securing a plurality of light transmitters or light receivers to a rotor positioned concentrically in the gantry.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENTS

This application is an improvement of U.S. Pat. No. 5,991,478 issued Nov. 23, 1999.

Figure 1:
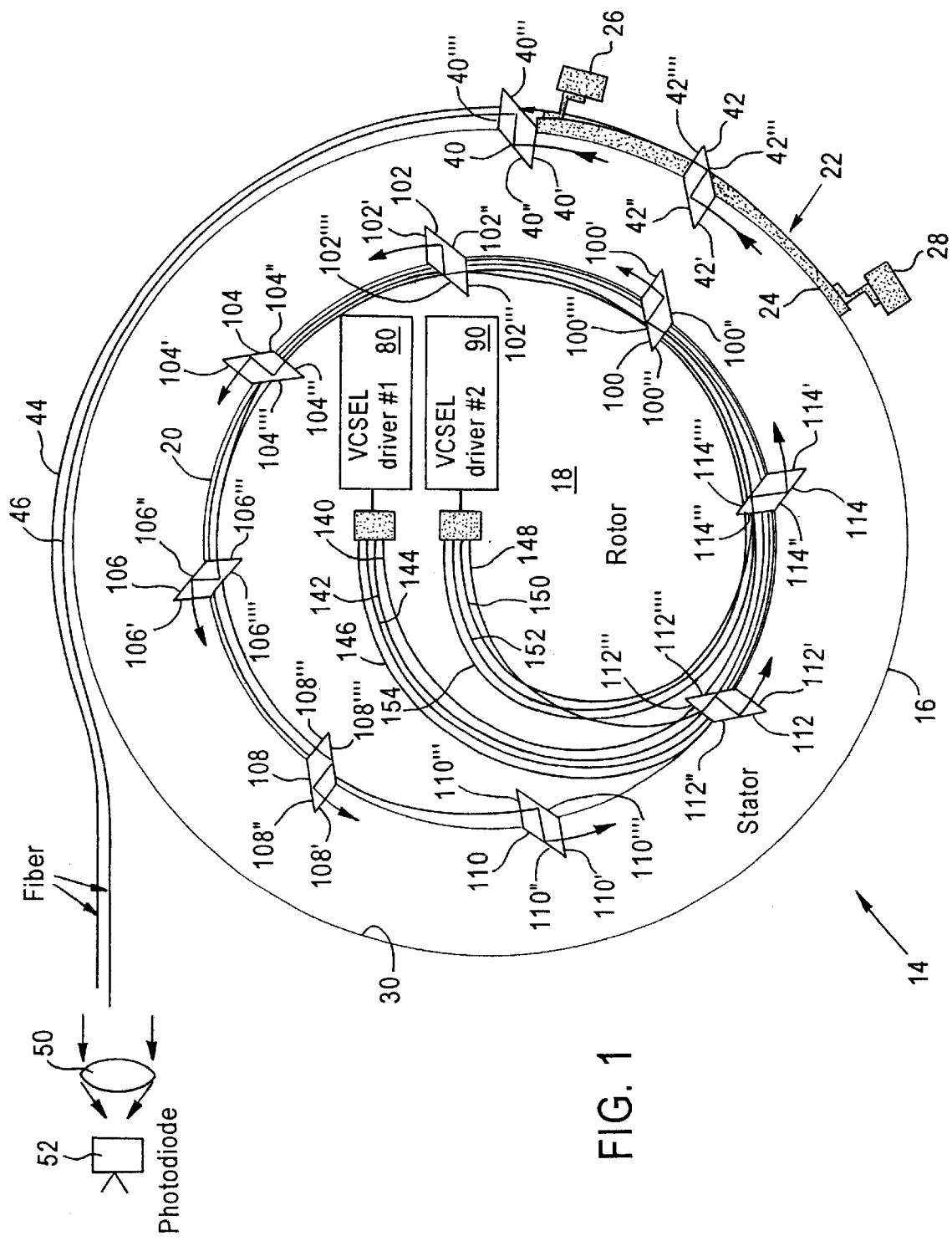
FIG. 1 is a schematic representational view of the fiber optic rotary joint having a single mented optical waveguide according to the present invention.

Refer now to FIG. 1 wherein a first embodiment of a fiber optic rotary joint, generally indicated at 14, is illustrated which is constructed in accordance with the principles of the present invention. The fiber optic joint 14 is usable in any environment requiring a large diameter rotary joint capable of transmitting high bit-rate signals and is particularly useful for cat-scan machines. For convenience, the fiber optic rotary joint will be described in relation to the orientation illustrated in FIG. 1 and consequently, terms such as "above," ""upwardly," and "clockwise," and "counterclockwise," as used herein are to be construed in the relative sense.

The present invention is most advantageously used when installing a fiber optic rotary joint into the gantry of an existing cat-scan machine. The existing gantry has a cylindrical bore into which segmented waveguides are positioned to form a stator according to the present invention.

Fiber optic rotary joint 14 includes a stator 16 and a rotor 18. Rotor 18 has a circular outer circumference 20. The stator 16 is the stationary part of the fiber optic rotary joint 14. The stator 16 includes at least one segmented waveguide assembly 22 having an annular inner surface 24, a waveguide support 26 positioned at one end of the segmented waveguide assembly 22 and a waveguide support 28 positioned at an opposite end of the segmented waveguide assembly 22. At least one segmented waveguide 22 assembly is required to form a rotary fiber optic joint according to the present invention. The annular inner surface 24 is highly reflective and can be coated with a gold coating and then polished. The supports 26, 28 are attached to the gantry in a conventional manner.

Two light receivers depicted as parallelograms 40, 42 are positioned on the waveguide assembly 22 to receive light or optical energy transmitted by arallelograms 100 and 114 and reflected by surface 24.

Parallelogram 40 is located at one end of the waveguide assembly 22 and parallelogram 42 is located at an intermediate location thereof and each is fixed to waveguide assembly 22. Other light bending devices can be used for all of the light transmitters and receivers described with reference to FIGS. 1–4 as long as the light is bent at a 90° angle, such as optical fiber cut off at a 45° angle or a small diameter malleable tube having optical fiber in a tube and bent at 90°.

As illustrated in FIG. 1, parallelogram 40 has a surface 40', which is located at an end of the annular reflective surface 24 and extends radially inwardly therefrom. A first light reflection surface 40" reflects light in a normal direction relative to the annular surface 24 depicted in FIG. 1. A second light reflective surface 40''' is located radially outwardly from the annular surface 24 and is parallel to surface 40". A fourth surface 40'''' extends radially outwardly from the surface 24. Similarly, parallelogram 42 has surfaces 42', 42", 42''' and 42''''. Fibers 44, 46 are connected to parallelograms 40, 42, respectively.

Eight light transmitters depicted as parallelograms are preferably equally circumferentially positioned on the outer circumference 20 of rotor 18 and extend radially outwardly therefrom. The parallelograms could also be unequally spaced. Instead of parallelograms other light bending devices can be used as long as the light is bent at approximately a 90° angle. Each parallelogram 100, 102, 104, 106, 108, 110, 112, 114 has a corresponding light injecting surface 100', 102', 104', 106', 108', 110', 112', 114' extending radially outwardly from the outer circumference 20. A first reflecting surface extends at 100", 102", 104", 106", 108", 110", 112", 114" an angle from outer circumference 20. Hence, as depicted in FIG. 1, each light receiving prism is positioned at 45° intervals from the next adjacent light receiving prism. Light injecting faces 100', 102', 104', 106', 108', 110', 112', 114', face in a counterclockwise direction as depicted in FIG. 1. Light receiving face 40', 42' face in a counterclockwise direction as depicted in FIG. 1. The orientation of these faces can be reversed so long as the light injecting surfaces face in an opposite direction from the light receiving surfaces. A second light reflecting surface 100''', 102''', 104''', 106''', 108''', 110''', 112''', 114''' receives optical energy injected through a corresponding light receiving surface 100'''', 102'''', 104'''', 106'''', 108'''', 110'''', 112'''', 114''''.

Fiber optic cables 140, 142, 144, 146 are connected at one end thereof to VCSEL driver No. 1 and fiber optic cables 148, 150, 152, 154 are connected at one end thereof to VCSEL driver No. 2. Fiber optic cables 140, 142, 144, 146 are connected at an opposite end thereof to light transmitting parallelograms 100, 102, 104, 106 and fiber optic cables 148, 150, 152, 154 are connected at an opposite end thereof to 108, 110, 112, 114, respectively.

In operation, the rotor 18 can rotate in either a clockwise or a counterclockwise direction as depicted in FIG. 1. VCSEL 80 and VCSEL 90 each nearly simultaneously transmit an optical signal containing identical information and inject those signals into optical fibers 140–146 and 148–154, respectively. Fibers 44, 46 are connected to parallelograms 40, 42, respectively.

Each signal is then launched by a respective parallelogram 100–114 into the inside diameter 30 of the gantry. Each signal emitted by a respective parallelogram 100–114 is emitted nearly simultaneously and contains identical information. The amount of power for a given signal is determined, in part, by the desired data rate.

Using multiple light sources around the circumference of the rotor 18 or stator 16 allows the transmitted signal to be picked up in multiple locations. As depicted in FIG. 1, optical energy emitted from surface 100' of parallelogram 100 is received at surface 40' of parallelogram 40 after being reflected by the annular waveguide surface 24. For example, it is known from communication theory that an optical receiver that is capable of receiving a bit stream at a data ate of 125 Mb/s must receive a minimum of $8 \times 10^{-7}$ watts to meet a $1 \times 10^{-9}$ bit error rate. Although the light transmitters 100–114 are shown in the figure at 45° intervals, it is known that a more uniform signal will be received as the rotor 18 moves with respect to the stator 16 if the light transmitters are not located precisely at 90° intervals. For example, one set of conditions may have the light transmitters arranged at 0°, 82.5°, 165° and 247.5°. The number and location of sources can be varied to meet the data rate requirements.

The optical signals emitted from faces 100'–114' impinge on and are reflected by the reflective section 24, respectively, and propagate along the surface in short chordal paths until being intercepted and received by, as depicted in FIG. 1, light receiving parallelograms 40'and 42' respectively. Parallelograms including 102–112 located adjacent to the non-reflective inner diameter of the gantry send optical signals which are either not reflected or are highly attenuated. For example, as depicted in FIG. 1, light or optical energy 110, 108, 104, 102, 122, 120, 116, 114 do not receive optical signals.

Referring specifically to FIG. 1 and parallelograms 42 and 40 as depicted in FIG. 1, only parallelogram 40 will receive a usable signal from parallelogram 100 due to the signal emitted from other parallelograms 102–112 becoming attenuated or dissipated. Parallelogram 42 will receive a usable signal from parallelogram 114. For example, using a 40–50 milliwatt laser, parallelogram 40 should receive an optical signal equivalent to an electrical signal of approximately 5–10 mV while positioned thirty degrees away. Parallelogram 42 should receive an optical signal equivalent to an electrical signal of approximately 30–40 mV.

The intensity of the optical signal emitted by parallelogram 114 is usable in reflective section 24 but the optical signal emitted by parallelogram 112 becomes too low by the time the optical signal reaches area 24. If the optical signal emitted by parallelogram 112 were detected, it would cause bit width distortion due to propagation delay. Part of the reason the signal is not detected is because of noise levels which are approximately 1-mV for an amplifier capable of producing 100–400 megabit/sec., signals as used in the present invention.

Each optical signal is then transmitted through optical fibers 44, 46 and focused by a lens 50 and received by a photodiode 52. Advantageously, this arrangement solves optical amplitude variations by permitting signals to be transferred at all rotational positions of rotor 18. With reference to FIG. 1, the waveguide 22 is reflective throughout its entire length and extends for up to a 135° angle. By contrast, the parallelograms are spaced at a 45° angle. Thus, during the rotation of rotor 18, at least one, and at times two, parallelograms will be located adjacent the annular surface 24.

The waveguide 22 length and/or the length that the receiver is located from the transmitter is restricted to a length that permits acceptable bit distortion. Thus, as bit-rate increases, the length of waveguide must decrease and/or additional transmitters must be used. In the present invention, more transmitters are used than receivers. Ultimately, the bit-rate can increase until it is not possible to have an acceptable length of waveguide such that a uniform signal can be picked up at all angles. In this event, it may be desirable to provide additional light injecting parallelograms on the rotor and additional light receiving parallelograms around the stator to shorten the path length around the reflective annular surface between the light injecting prism and the light receiving prism.

An advantage of allowing the signal to be propagated in air rather than a medium such as glass or plastic is that the propagation speeds are faster in air. (Propagation speed for air is approximately 3 ns/meter; propagation speed for glass having a refractive index equal to 1.41 is approximately 5 ns/meter.) Propagation speed ultimately determines the effective length of waveguide that can be used as bit-rate increases. Thus, more length of waveguide will be available for the transfer signal when the signal is propagating in air rather than a glass or fiber.

Figure 2:
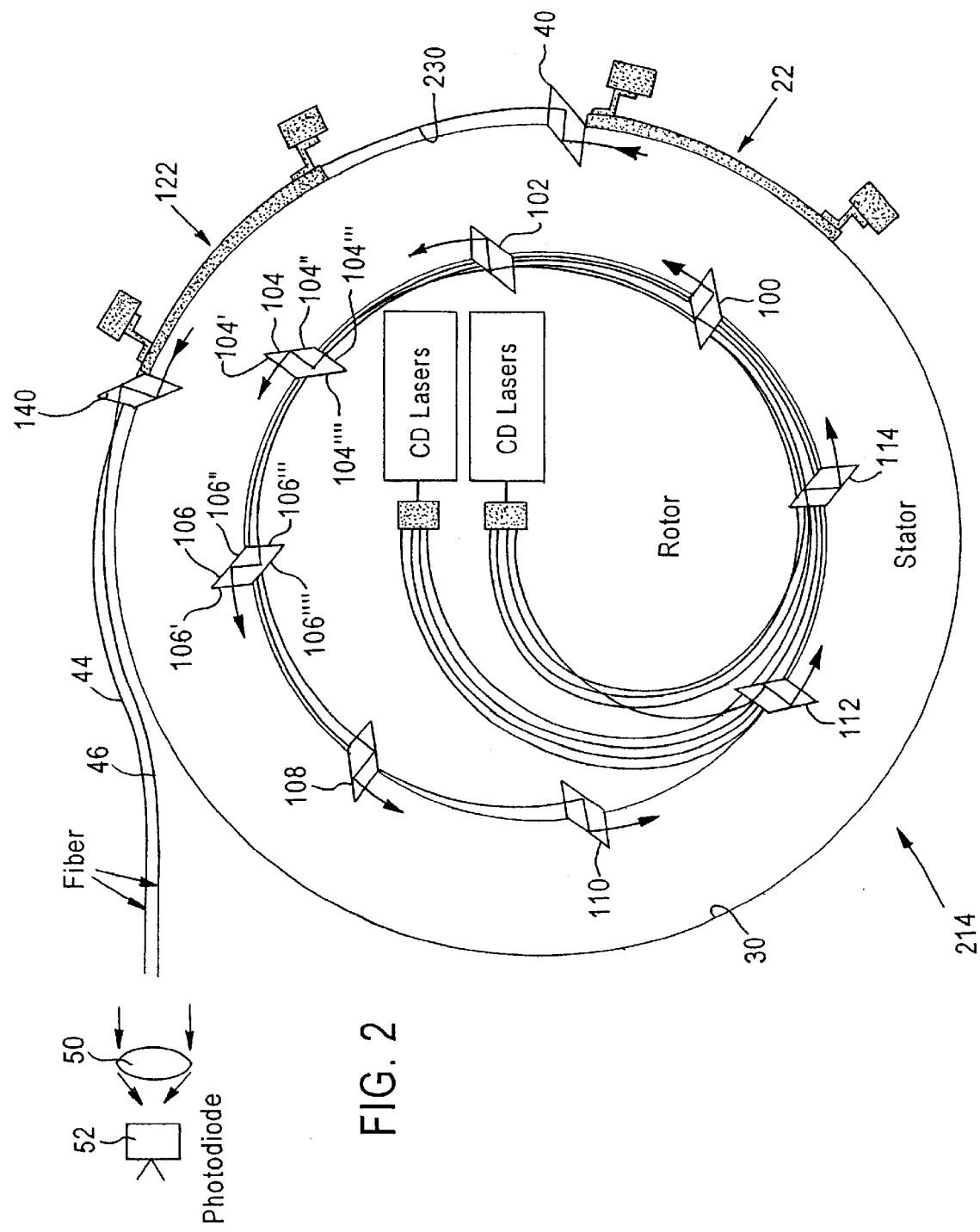
FIG. 2 is a schematic representational view of a fiber optic rotary joint having multiple segmented waveguides according to the present invention.

Refer now to FIG. 2 where another arrangement for the present invention is depicted. The FIG. 2 embodiment differs from the FIG. 1 embodiment. A second segmented waveguide 122 is circumferentially spaced from the first waveguide assembly 22. A non-reflective inner surface of the gantry 230 is formed between the waveguide assemblies 22 and 122. As depicted in FIG. 2, each waveguide assembly 22, 122 has only a single parallelogram 40, 140, respectively. It should be understood that any number of parallelograms can be spaced on each of the wave guide assemblies.

Figure 3A:
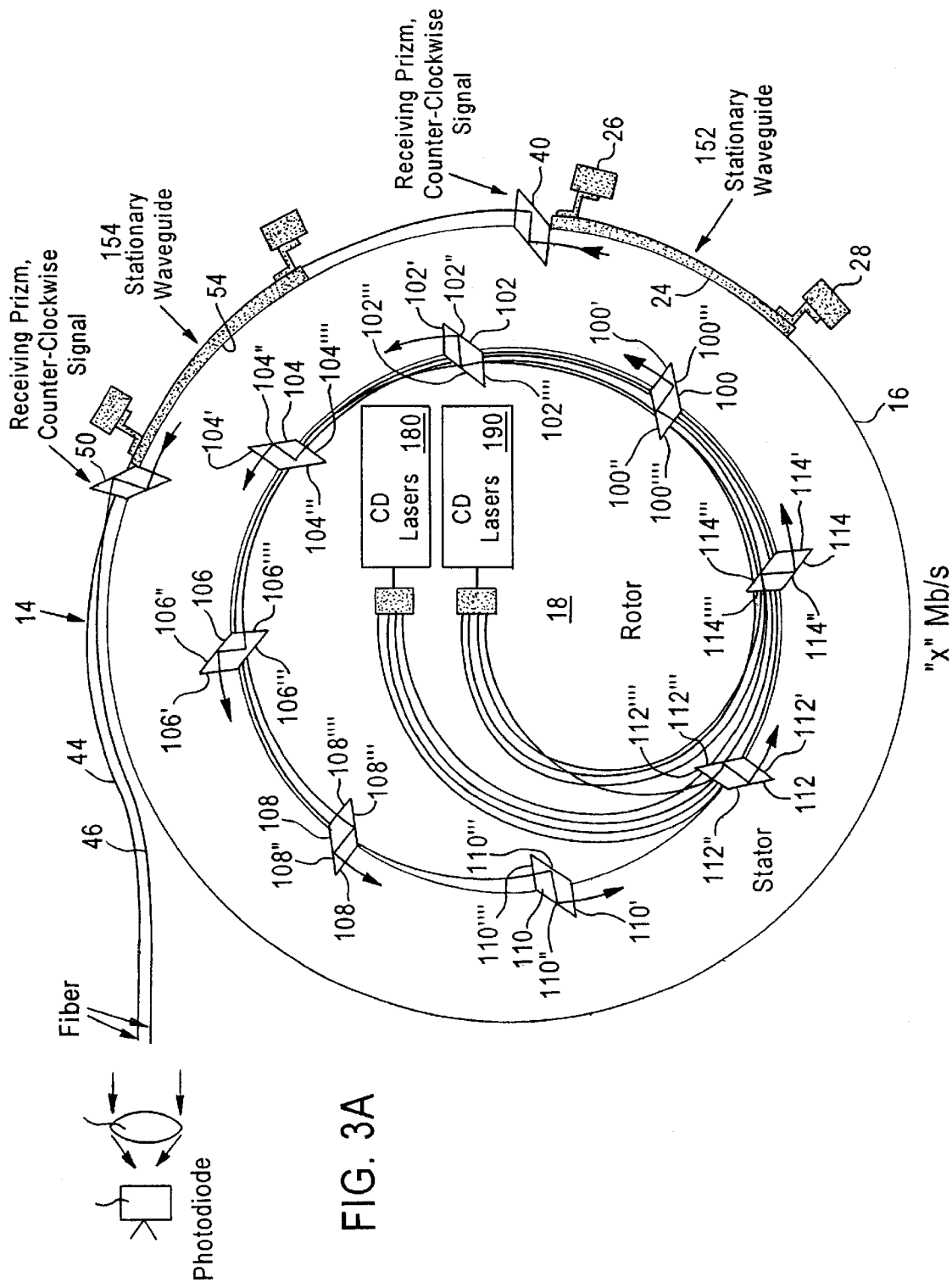
FIGS. 3A and 3B are schematic representational view of counter-rotating embodiment for the fiber optic rotary joints of FIGS. 1 and 2.
Figure 3B:
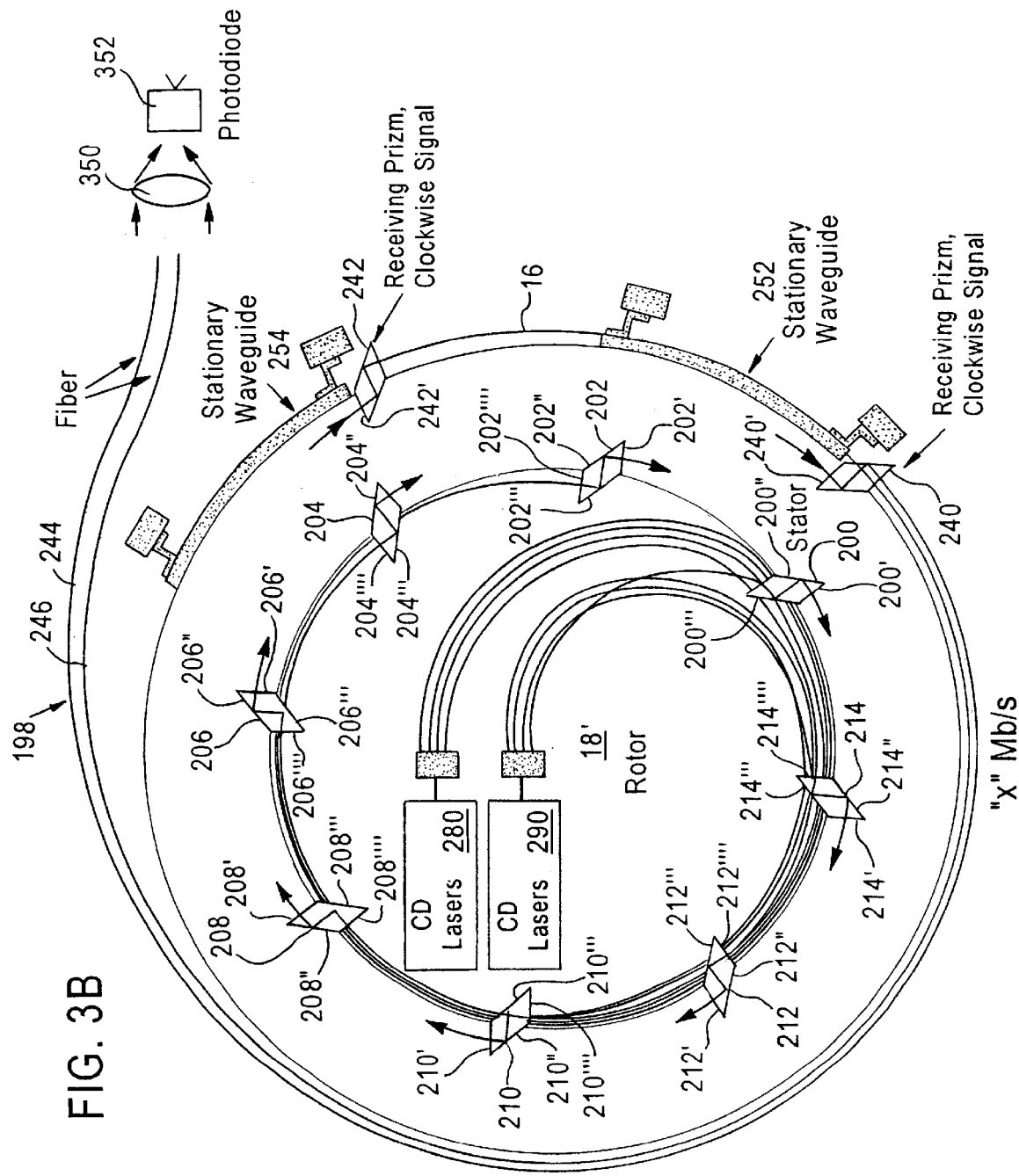

Referring now to FIG. 3, a schematic representation of counter rotating rotors is depicted. As depicted in FIG. 3, there is a rotor 18. For clarity, two separate illustrations have been used. In the actual system, the same waveguides are used to guide counter-rotating optical signals. The light sources on the stator are oriented to inject light into the stationary waveguides in both clockwise and counterclockwise directions, thus, providing counter-rotating signals which allows the data rate to be doubled without adding additional waveguides. The two rotors rotate in opposite directions, in other words are counter rotating. The light sources on the rotor are oriented to inject light into the stationary waveguides 152, 154 and 252, 254, respectively in both clockwise and counter clockwise directions. Thus, in the embodiment depicted in FIG. 3, the counter rotating signals allow the data rate to be doubled without adding additional waveguides. As depicted in FIG. 3, waveguide assembly 14 is identical to the embodiment shown in FIG. 1 while waveguide 198 is a counter rotating embodiment identical which is similar to a mirror image of the FIG. 1 embodiment. Each optical signal traveling in the clockwise direction is transmitted through optical fibers 244, 246 and focused by a lens 350 and received by a photodiode 352.

More specifically, there are eight parallelograms 200–214 which inject light in a clockwise direction as depicted in FIG. 3. Each parallelogram has respective faces 200', 200", 200''', 200'''', 214', 214", 214''', 214''''which function identically to parallelograms 100–114. Stationary waveguides 252, 254 have light receiving parallelograms which receive clockwise signals through faces 240', 242', respectively.

Figure 4:
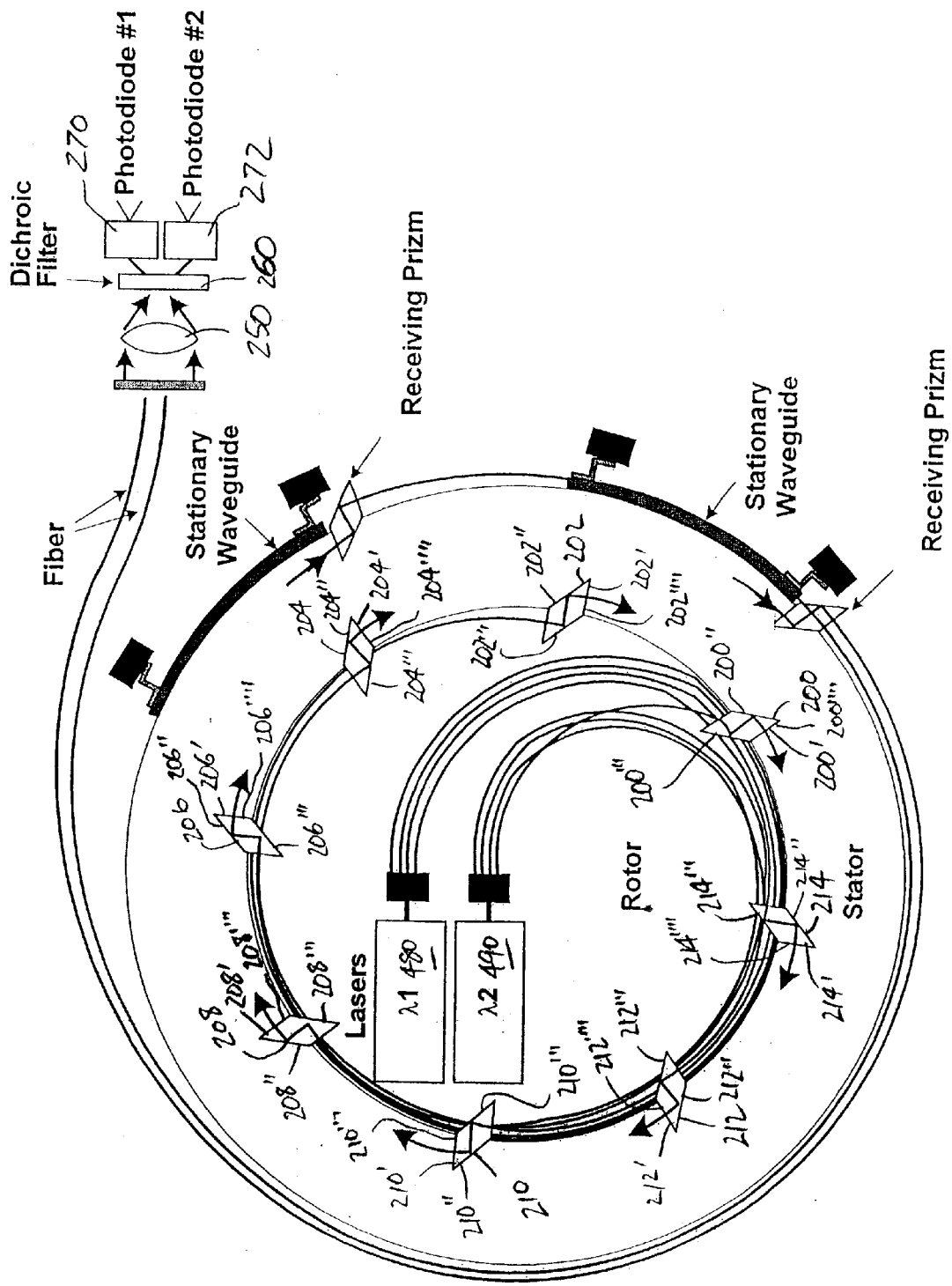
FIG. 4 is a schematic representational view of an alternative arrangement having light transmitted at two wavelengths $\lambda_1$ and $\lambda_2$ usable in the fiber optic rotary joints of FIGS. 1, 2 and 3.

In FIG. 4, a multi-channel capability via waveguide division multiplexing is depicted. The FIG. 4 embodiment is identical to the clockwise embodiment depicted in FIG. 3 except that there are two lasers 480, 490 which inject light at wave lengths $\lambda_1$ and $\lambda_2$, respectively. The light is ejected through prisms 200, 214, respectively and is received through light receiving parallelograms or prisms 240, 242, respectively. The light is focused through a lens 250. The focused light from the lens 250 is focused into a dichroic filter 260 which is then divided by wavelengths into photodiode 270, 272.

In any of the above described embodiments, instead of providing a fully assembled stator which is expensive to manufacture, relatively short arcuate sections of waveguide can be manufactured which are considerably less expensive to manufacture than full 360° annular waveguides. Advantageously, this provides a significant cost reduction measure as compared to already existing devices. In any of the described embodiments, the arcuate waveguide section is formed to be placed on the inner diameter of the gantry. Thus, the shape of the arcuate section will depend upon the inner diameter of the existing gantry. The waveguide section is fastened to the existing gantry using conventional methods.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A segmented waveguide for a fiber optic rotary joint, the fiber optic rotary joint including a rotor and an existing stator surface, the rotor having one of a plurality of light transmitters and light receivers connected to a first circumference of the rotor, said segmented waveguide mountable to the existing stator surface, said segmented waveguide capable of reflecting optical energy transmitted from the plurality of light transmitters on the rotor, comprising:

a reflective waveguide surface shaped to match a portion of the existing stator surface;

at least one waveguide support supporting said reflective waveguide surface and connectable to the existing stator; and at least one of a light transmitter or light receiver optically coupled to said reflective waveguide surface.

2. The segmented waveguide for a fiber optic rotary joint of claim 1, wherein at least one light transmitter or light receiver is positioned at one end of said reflective waveguide surface.

3. The segmented waveguide for a fiber optic rotary joint of claim 1, wherein said reflective waveguide surface extends for approximately an arc of 135° of the existing stator surface.

4. The segmented waveguide for a fiber optic rotary joint of claim 1, wherein said waveguide support is located at one end of said reflective waveguide surface.

5. The segmented waveguide for a fiber optic rotary joint of claim 1, wherein said at least one of a light transmitter or light receiver is a parallelogram.

6. The segmented waveguide for a fiber optic rotary joint of claim 4, further comprising a second waveguide support located at an opposite end of said waveguide surface.

7. The segmented waveguide for a fiber optic rotary joint of claim 5, further comprising an optical fiber associated with said at least one light transmitter and receiver, said optical fiber extending generally tangentially relative to said reflective waveguide surface.

8. The waveguide section mountable in an existing circular bore of claim 1, wherein the existing stator surface is non-reflective.

9. A waveguide section mountable in an existing circular bore, comprising:

an arcuate reflective waveguide surface extending up to a 135° arc of the existing circular bore; and a waveguide section supporting structure for mounting said reflective waveguide surface in the existing circular bore and including one of a light transmitter and a light receiver each of which either transmit or receive light in a tangential direction which is reflected by said reflective waveguide surface.

10. The waveguide section mountable in an existing circular bore of claim 9, wherein at least one light transmitter or light receiver is positioned at one end of said reflective waveguide surface.

11. A method of retrofitting an existing gantry with a fiber optic rotary joint, comprising:

securing at least one reflective segmented waveguide surface to an inner diameter of the existing gantry using a segmented waveguide structure;

securing one of a light transmitting device and light receiving device to the reflective waveguide; and securing a plurality of light transmitters or light receivers to a rotor positioned concentrically in the gantry.

* * * * *